United States Patent [19]

Seidman

[11] Patent Number: 5,050,096
[45] Date of Patent: Sep. 17, 1991

[54] PATH COST COMPUTING NEURAL NETWORK

[75] Inventor: Abraham N. Seidman, Beverly Hills, Calif.

[73] Assignee: Northrop Corporation, Hawthorne, Calif.

[21] Appl. No.: 412,696

[22] Filed: Sep. 26, 1989

[51] Int. Cl.$^5$ .............................................. G06F 15/18
[52] U.S. Cl. .................................................. 364/513
[58] Field of Search ........................................ 364/513

[56] References Cited

U.S. PATENT DOCUMENTS

| | | | |
|---|---|---|---|
| 4,858,147 | 8/1989 | Conwell | 364/513 |
| 4,914,604 | 4/1990 | Castelaz | 364/513 |
| 5,001,631 | 3/1991 | Castelaz | 364/513 |

Primary Examiner—Allen R. MacDonald
Attorney, Agent, or Firm—Terry J. Anderson; Robert B. Block

[57] ABSTRACT

The operation of an electronic neural computer is described. This electronic neural computer solves for the optimal path in a space of "cost functions" which are represented as delays at the nodes of a grid (in two, three, four, or more dimensions). Time gating by delays lets the optimal solution thread the maze of the network first. The neural computer starts to compute all possible paths through the cost function field and shuts down after the first (optimal solution) emerges at the target node. The cost function delays are set from outside the neural computer architecture.

12 Claims, 9 Drawing Sheets

FIG. 6

READ OPTIMAL PATH UPON FIRST RECEPTION ←

| LAST NODE VISITED | .... | 3-RD NODE VISITED | SECOND NODE VISITED | FIRST NODE VISITED | INITIAL HEADER BEGINNING IDENTIFICATION |

3-DIMENSIONS

SINGLE CUBE PROJECTED

2-DIMENSIONS

MULTIPLE CUBES PROJECTED

PATH COST COMPUTING NEURAL NETWORK

TECHNICAL FIELD OF THE INVENTION

This invention relates to neural networks, and more particularly to neural networks and to neural network methods useful for solving problems involving global extremes representable by cost functions.

BACKGROUND OF THE INVENTION

Computing apparatus of the neural network type has been described, for instance, by J. J. Hopfield in "Neurons With Graded Response Have Collective Computational Properties Like Those of Two-state Neurons"; Proc. Natl. Acad. Sci., USA Vol 81, pp. 3088-3092 (1984) and by J. J. Hopfield and D. W. Tank in "Neural Computation of Decisions in Optimization Problems", Biological Cybernetics, Vol. 52, (1985), 141-152; as well as in U.S. Pat. No. 4,660,166 dated Apr. 21, 1987 to J. J. Hopfield and U.S. Pat. No. 4,719,591 dated Jan. 12, 1988 to J. J. Hopfield and D. W. Tank. For a general discussion of the mathematical physics used in the present invention, reference is made to H. Goldstein, Classical Mechanics, $2^{nd}$ edition, Addison-Wesley, Reading, Massachusetts, 1980, 672 ff and to D. Laugwitz, Differential and Riemannian Geometry, Academic Press, New York, 1965, 238 ff.

Previous networks, such as the Hopfield network as described in J. J. Hopfield, "Neural Networks and Physical Systems With Emergent Collective Computational Abilities", Proc. Natl. Acad. Sci., U.S.A., Vol 79, p. 2554(1982); J. J. Hopfield, "Neurons With Graded Response Have Collective Computational Properties Like Those of a Two-State Neuron" Proc. Natl. Acad. Sci., U.S.A. Vol. 81, p. 3088 (1984); and J. J. Hopfield and D. W. Tank, "Computing With Neural Circuits: A Model", Science, Vol. 233, p. 625(1986) minimize a system Hamiltonian $$H = T + V \quad (1)$$

to find local and global minima. These networks have been applied to feature extraction, associative recall, and constraint satisfaction (or problem optimization). Problems associated with use of these networks include convergence on a local minimum and not the global minimum, giving rise to non-optimal solutions.

A number of electronic neural network architectures of the Hopfield type have also been described in the literature: L. D. Jackel, H. P. Graf, and R. E. Howard in "Electronic Neural Network Chips", Applied Optics, Vol. 26, p. 5077 (1987); A. P. Thakoor, A. Moopen, J. Lambe, and S. K. Khanna in "Electronic hardware implementation of neural networks", Applied Optics, Vol. 26, p. 5085 (1987); D. B. Schwartz, R. E. Howard, J. S. Denker, R. W. Epworth, H. P. Graf, W. Hubbard, L. D. Jackel, B. Straughn, and D. M. Tennant, Appl. Phys. Lett., Vol. 50, p. 16 (1987); and L. D. Jackel, R. E. Howard, H. P. Graf, B. Straughn, and J. S. Denker, J. Vac. Sci. Tech., Vol. B4, p. 61 (1986). The following references herein cited contain features which can be incorporated and used with the present invention and are therefore incorporated herein by reference in their entireties.

SUMMARY OF THE INVENTION

The present invention presents a type of neural network, and a method of operating a neural network, which is based on the realization that problems involving global extremes representable by cost functions can be solved by using the principle of least action in its Lagrangian form and that neural networks can be realized in a form adapted to perform the required computations. In the Lagrangian formulation, the action, S, is given by $$S = \int L(x, \dot{x}, t) dt \quad (2)$$

where L is the Lagrangian for the system. The Lagrangian is typically given as $$L = T - V \quad (3)$$

where T is the system kinetic energy and V is the potential energy. The Δ variation (as defined in Goldstein, for example) allows for the different paths over which the integral is evaluated to end at different times and at different coordinates). The solution path has, of course, fixed end location and time points. In the following discussion, an illustration of the development and application of the invention will be given in reference to aircraft warfare, although the invention itself is not so limited.

Three spaces should be distinguished: (1) The physical space of the aircraft and its environment (2) The multi-dimensional cost function space, and (3) the space of the chip architecture.

The physical space of the aircraft and its environment is defined as normal three-dimensional space plus time. The positions of the ownship and other aircraft are specified at some x,y,z position at some time t, for each aircraft. Ground threats are specified at some x,y location.

The cost function space, in the example used, consists of the risk probability, $P_r$, of the ownship due to enemy aircraft (air-to-air engagement). The aircraft may operate in an uncertain environment. One could also consider the positions, velocities, and types of enemy aircraft will not be known precisely. In this situation, in addition to probability of kill, $P_k$, and probability of survival, $1 - P_r$, considerations, one must also deal with the probabilistic character of the overall situation awareness.

The space of the chip architecture deals with include two-, three-, and four-dimensional cartesian structures, with nodal points $n_{ij...}$ at the intersection of two-way buses. The nodal points are set up to provide variable delays (which are proportional to the scalar cost functions $C_{ijk}$).

Physical space is mapped into chip architecture by assigning a region around $x_a, y_a, z_a, t_a$ in a physical space is mapped to a node $(i_a, j_a, k_a, l_a)$ which represents a discreet point in chip space. Cost (risk of loss) in aircraft physical space is thus transformed into a cost function expressed in the chip architecture space as a delay function imposed on each respective node.

The present invention is based on the realization that one can solve for optimal path by choosing using the above mapping model by computing all possible paths efficiently in the chip architecture, and finding the least risk by noting the signal with the shortest transit time between designated starting node (ownship) and ending node (target). The procedure, then, is to send a signal through all paths (in a neural network, to be described) from the ownship node to the target node, and to look for the first signals being received at the target node.

Each signal that passes a node has added to it an identification tag for that node and also experiences a delay according to the cost function or risk that is associated with that node. Thus, the first signal received at the target node will be that of the overall least delay (risk) and will carry the information as to each of the series of nodes, i.e., the path coordinates, through which it passed.

A more detailed explanation will now be given to explain how the problem is solved by computing all paths and finding the optimal path in the space of a (scalar) cost function.

In order to analyze the problem for a neural network based on the above, reference will be made to certain functional relations from the calculus of variations.

The $\Delta$ variation of the action integral is defined as:

$$\Delta \int_{t_1}^{t_2} L dt = \int_{t_1 + \delta t_1}^{t_2 + \delta t_2} L(\alpha) dt - \int_{t_1}^{t_2} L(0) dt \quad (4)$$

Where $L(\alpha)$ is the integral evaluated along the varied path and $L(0)$ refers to the actual path of motion, and the Lagrangian is defined as set forth in equation (2).

As shown in the Goldstein reference, for non-velocity dependent potentials and for non-time dependent coordinates the least action formulation reduces to:

$$\Delta \int_{t_1}^{t_2} T dt = 0 \quad (5)$$

where T is the kinetic energy.

In order to actually apply the least action formulation to include cost function potentials, the Jacobi version of least action has to be used.

In the Jacobi formulation of the least action principle, 2T is the square of the velocity vector of the system point. Moreover, for $$T = \tfrac{1}{2} M_{jk}(q) \dot{q}_j \dot{q}_k \quad (6)$$

there exists a curvilinear and non-orthogonal space with the path length element in this space defined by:

$$(d\rho)^2 = M_{jk} dq_j dq_k \quad (7)$$

so that the kinetic energy has the form:

$$T = \tfrac{1}{2} \left( \frac{d\rho}{dt} \right)^2 \quad (8)$$

or $$dt = \frac{d\rho}{\sqrt{T}} \quad (9)$$

Consequently, $$\Delta \int_{t_1}^{t_2} T dt = 0 = \Delta \int_{t_1}^{t_2} \sqrt{T} d\rho \quad (10)$$

which from the known relation $$H = T + V \quad (11)$$

gives the Jacobi formulation $$\Delta \int_{\rho_1}^{\rho_2} (H - V(q))^{\tfrac{1}{2}} d\rho = 0 \quad (12)$$

See the reference to Laugwitz, at page 172.

For the Jacobi formulation, the geodesics are those paths with $$T + V = h = \text{constant} \quad (13)$$

These relationships will be used as the model for chip operation, to be described.

In order to map the cost functions to the dynamics of the chip operation, a data packet or "computon" particle with unit mass is considered. To motivate the computon, it will act as though it were launched into a three-space grid architecture, and is confined to the "bus" pathways, encountering the cost-functions at each of the cartesian node intersections (as delays). The computon is just a unit mass particle which is also subject to cost function potentials.

First, the potentials, V, in the Jacobi formulation are identified with the cost functions, $C_{ijk}$, so that, for the unit mass computon, on a geodesic, $$\tfrac{1}{2} v_{ijk}^2 + C_{ijk} = h \quad (14)$$

and $$v_{ijk} = [2(h - C_{ijk})]^{\tfrac{1}{2}} \quad (15)$$

One can write: $C_{ijk} = \alpha \Delta t_{ijk}$, where $\alpha$ is a constant of proportionality between the nodal scalar cost functions and the nodal time delays.

$$v_{ijk} = [2(h - \alpha \Delta t_{ijk})]^{\tfrac{1}{2}} \quad (16)$$

The larger the cost function at a point (ijk), the slower the velocity through the cost function field at that point. Since lengths in cost function space are mapped into delays, the sum total least delay is geodesic in this space. The first path which will be traversed is that which is traversed fastest, i.e., that which has the least total delay (summed cost functions). Thus, the scalar cost function, $C_{ijk}$ has been mapped to the scalar time delay, $(\Delta t)_{ijk}$. Each node of the chip is assigned a delay proportional to the cost function ($C_{ij}$, for two-dimensions, $C_{ijk}$ for three-dimensions, and $C_{ijkl}$ for four-dimensions).

Finding the least cost path can be implemented in a electronic neural network of a particularly convenient construction which may consist of a network in which there are provided a plurality of nodes each of which is connected to its nearest neighbor but is not in communication with any other nodes. Such networks will be described herein with reference to two, three, and four dimensional examples. The circuits used in the present invention transmit data packets or computons from every node, $n_{ij...}$, to all of the nearest neighbors of such node with modification by the attribute characteristic of that particular node $n_{ij}...$. Now, let one node, $n_{ownship}$, intitiate a data packet into the network, and let there be another, different node, $n_{target}$, somewhere else in the network. The packet will travel through all different nearest neighbor paths P so that eventually all such paths, $P_{nij...,nqr...},...$, that connect the ownship node to the target node will be traversed. Each path will contain one or more intervening nodes $n_{ij}..., n_{qr}..., ....$ Each node is an electronic circuit which processes the data packet in the following two essential ways. First, each node adds an identifier $I_{ij}...$ to the data packet, which identifier is unique to the particular node. Secondly, each node delays the transmission of the packet at the node, before retransmission, by a delay characteristic of the node, $\Delta t_{ij}...$, which delay represents the cost function attributable to that node $n_{ij}...$. It is also assumed that the internodal transmission times, both singly and collectively are insignificantly small compared to delays incurred at each node. It is seen that a data packet will arrive at the target node with a time delay that is the sum of the delays that have been introduced and with all of the identifiers that have been included from each of the identified nodes of the particular path that traversed.

The first data packet received at the target node from a preceding set of nodes represents the solution for least action and is regarded as the winner. The path information through all previous nodes to the target all the way back to the initial ownship node will have been encoded onto the data packet signal as the list of identifiers as it passed through the sequence of nodes making up the optimal data path (cf. sample communication protocol, FIG. 6). Other nodes which are adjacent to the target node also communicate to the target node, but arrive at the target later than the winning packet. The neural computer is reset after the arrival of the first packet to the target node. Thus, all paths from the initial starting point to the target point are potentially computed, but only the time to calculate the fastest path to the target node is actually used together with its nodal coordinates. The differentiation of the time to the target node from the initial node among the different possible paths is determined by the introduction of various delays representing risk at each intervening node. These delays are, therefore, a mapping (in the mathematical sense) of scalar "cost functions", specific to the problem to be solved.

Additional cost functions may arise from the physical limitations of the aircraft. In order to combine the physical behavior of the aircraft and the risk cost functions, the following is considered. An aircraft, for example, has a kinetic energy (since it is a solid object) given by:

$$T = \tfrac{1}{2}Mv^2 + \tfrac{1}{2}I_{ij}\Omega_i\Omega_j \qquad (17)$$

where M is the mass of the aircraft, v its velocity, $I_{ij}$ its inertial tensor, and $\Omega_i$ its angular velocity about its $i^{th}$ axis.

The Lagrangian of the physical space part of the system plus the Lagrangian of the cost function space are combined as follows:

$$C_{aircraft+risk} = C_{aircraft} + \sum_{ijk} \omega_{ij}...C_{ij}...risk \qquad (18)$$

The $w_{ij}...$ are the empirical weighting constants for the relative importance of the cost functions. These have to be established off-line, so to speak.

BRIEF DESCRIPTION OF THE DRAWINGS

FIG. 6 illustrates the protocol for tacking on the node identification code. The first message to arrive at the target node can then be read to determine which nodes constitute its optimal path.

Figure 8:
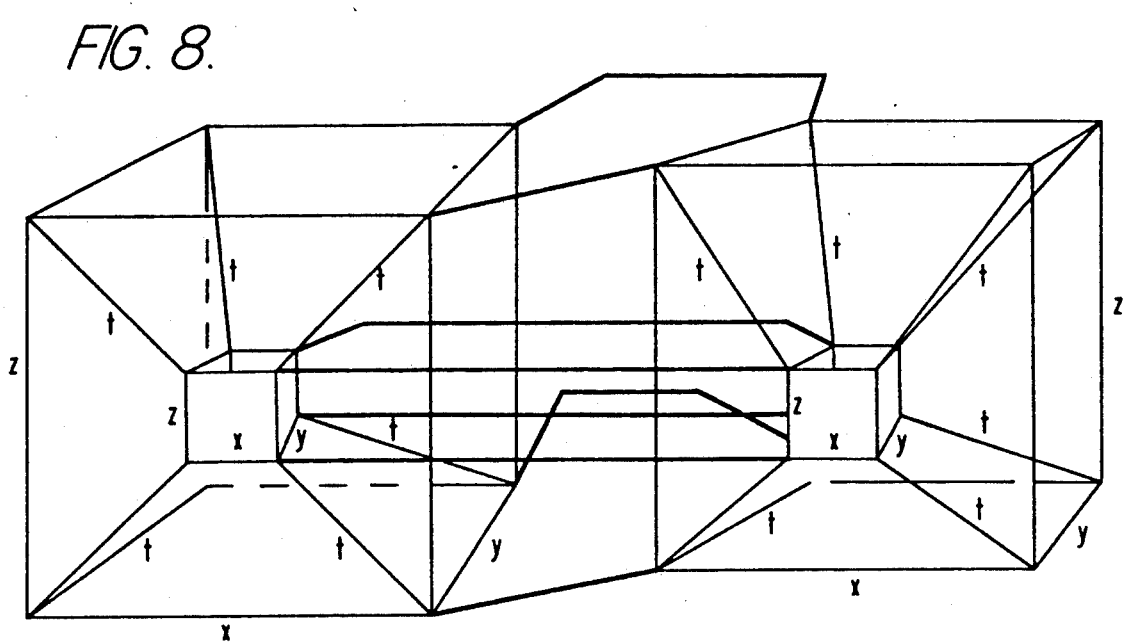
FIG. 8 shows a few of the 4-dimensional cubic network elements as they appear in three-dimensions.

TABLE I is a point description of FIG. 8.

Figure 9:
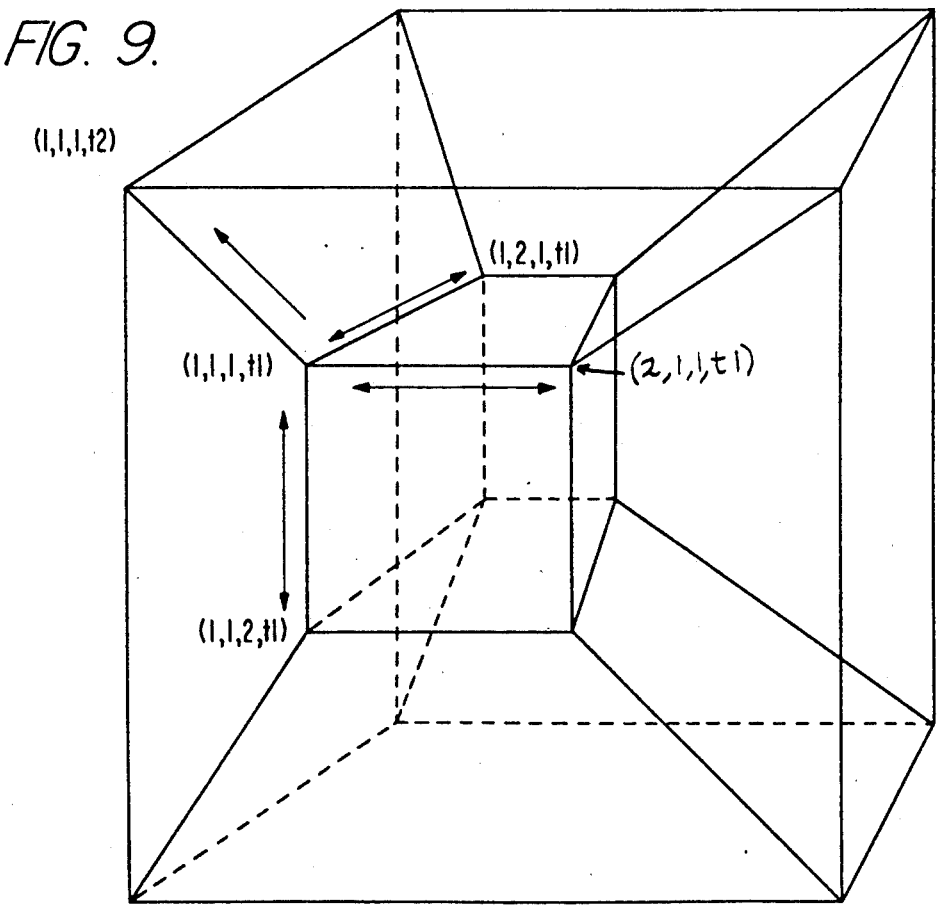

FIG. 9 indicates the flow of information on the 3-dimensional projection of a four-dimensional cube. Information flows forward in time as well as to adjacent 3-dimensional spatial points.

Figure 10:
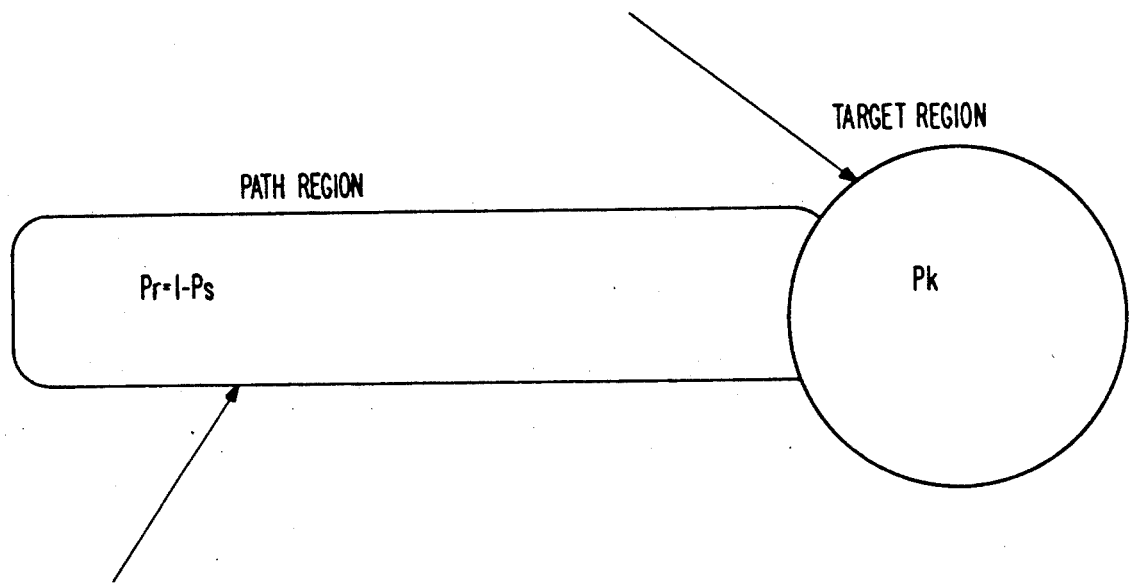

FIG. 10 shows schematically the target area and the area of risk to the aircraft, with a probability of risk based on the multiplicative combination of risk contributing factors listed in Table 1.

Figure 11:
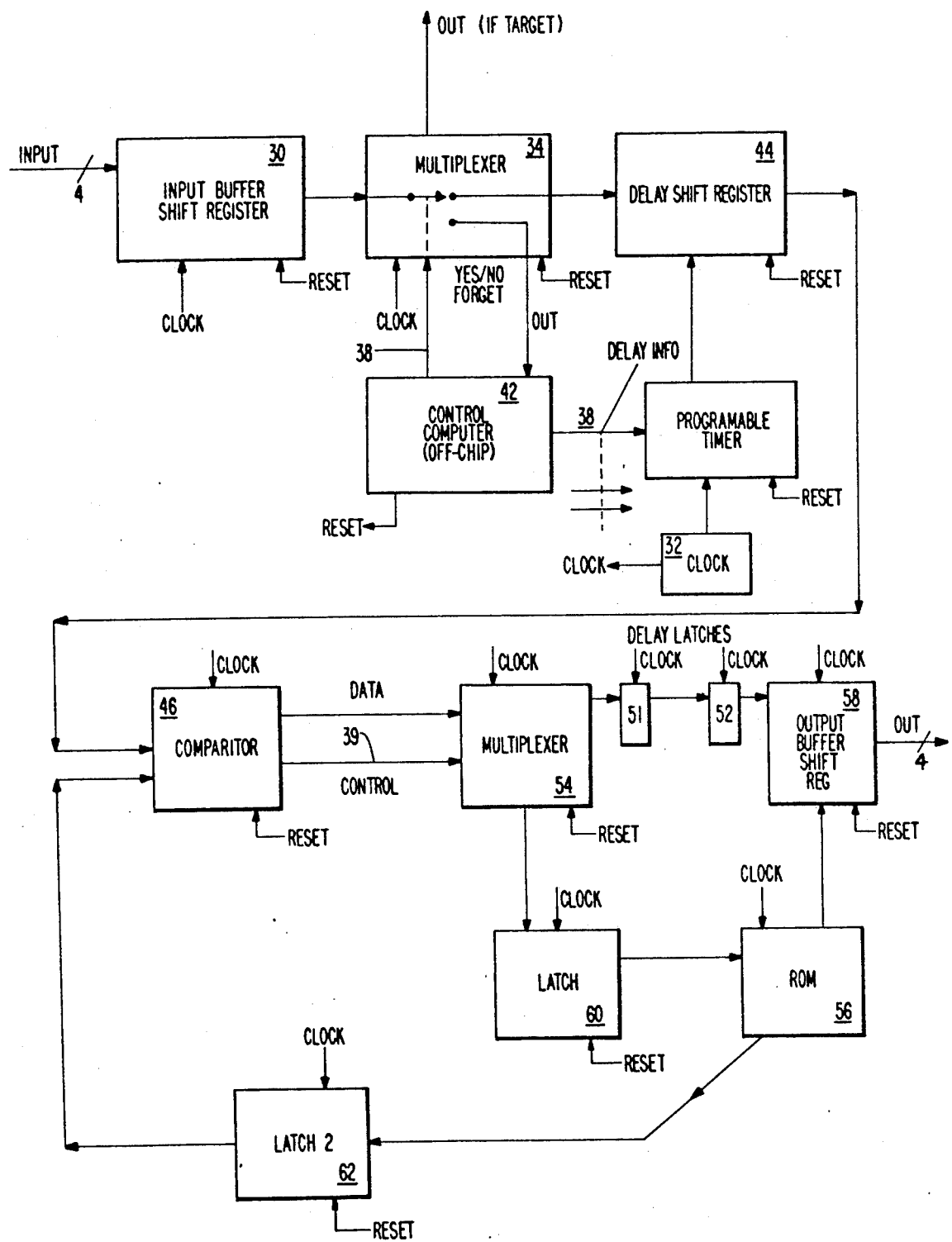

FIG. 11 depicts on possible realization of node circuitry for the circuits shown in FIGS. 1-5, 8 and 9.

TABLE II lists factors which enter into the risk probability.

DESCRIPTION OF PREFERRED EMBODIMENTS

Two Dimensional Case

In order to make the computation feasible, it is done on a particular type of electronic neural network with the representation of the net scalar cost function by delays. The cost functions are represented at each node as $C_{ij}$ or $\alpha\Delta t_{ij}$ for the two dimensional case. In two dimensions, a suitable neural network looks like FIG. 1 or FIG. 2, a rectangular grid or a hexagonal grid.

Figure 1:
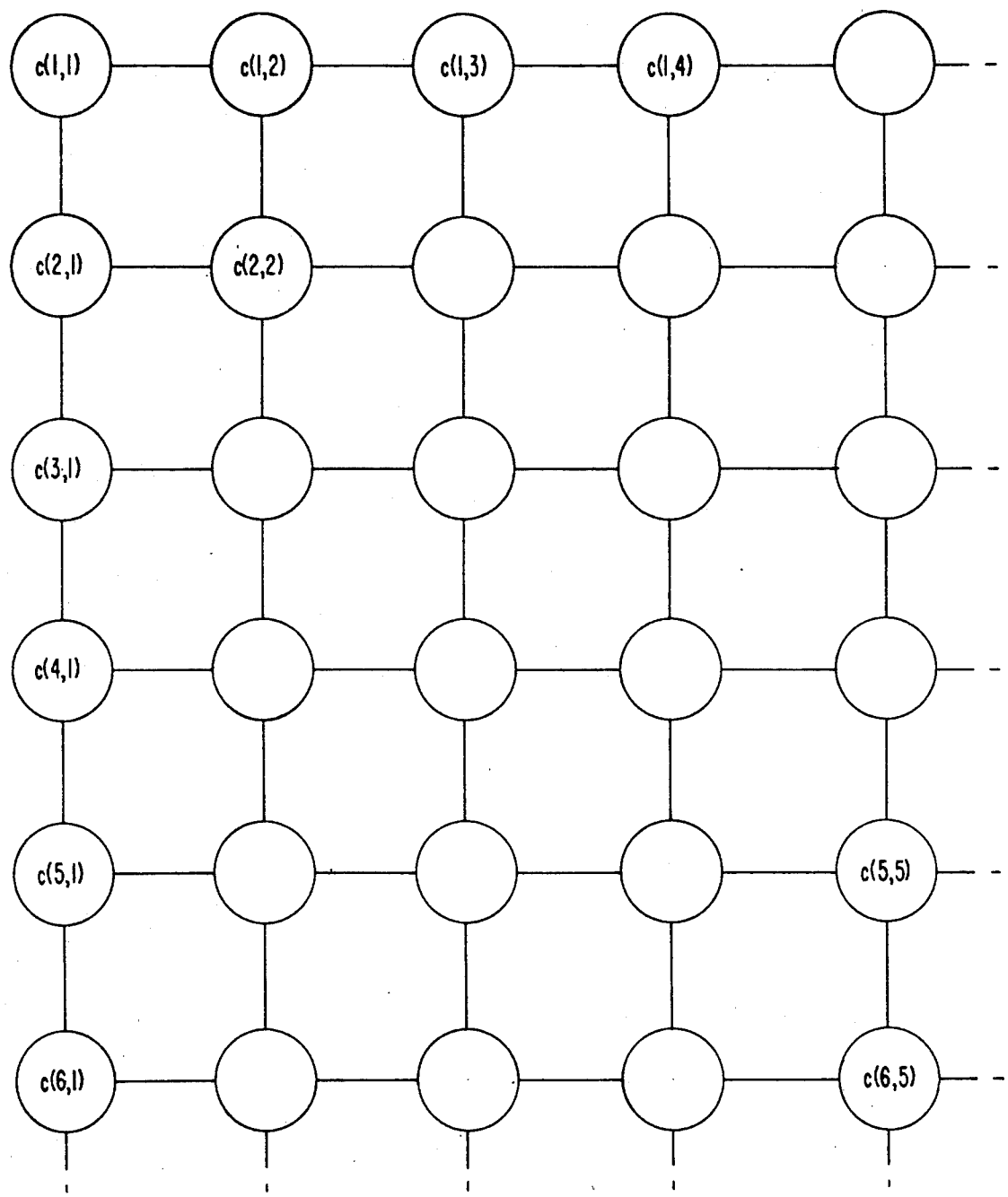
FIG. 1 shows a 6 by 5 rectangular grid version with some of the nodal cost functions ($C_{ij}$) labeled.
Figure 2:
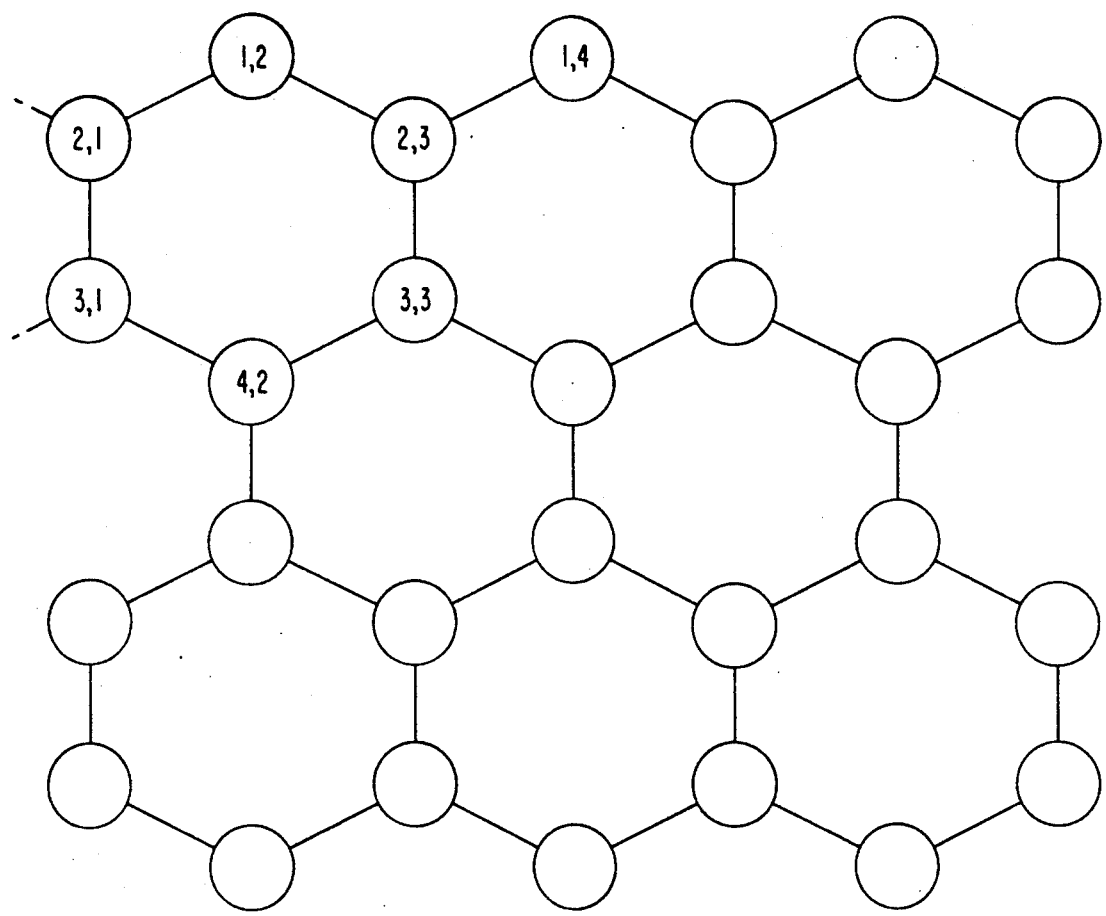
FIG. 2 shows a variation of the two-dimensional grid (made up of hexagons), the cost function labeling being indicated on some nodes.
Figure 3:
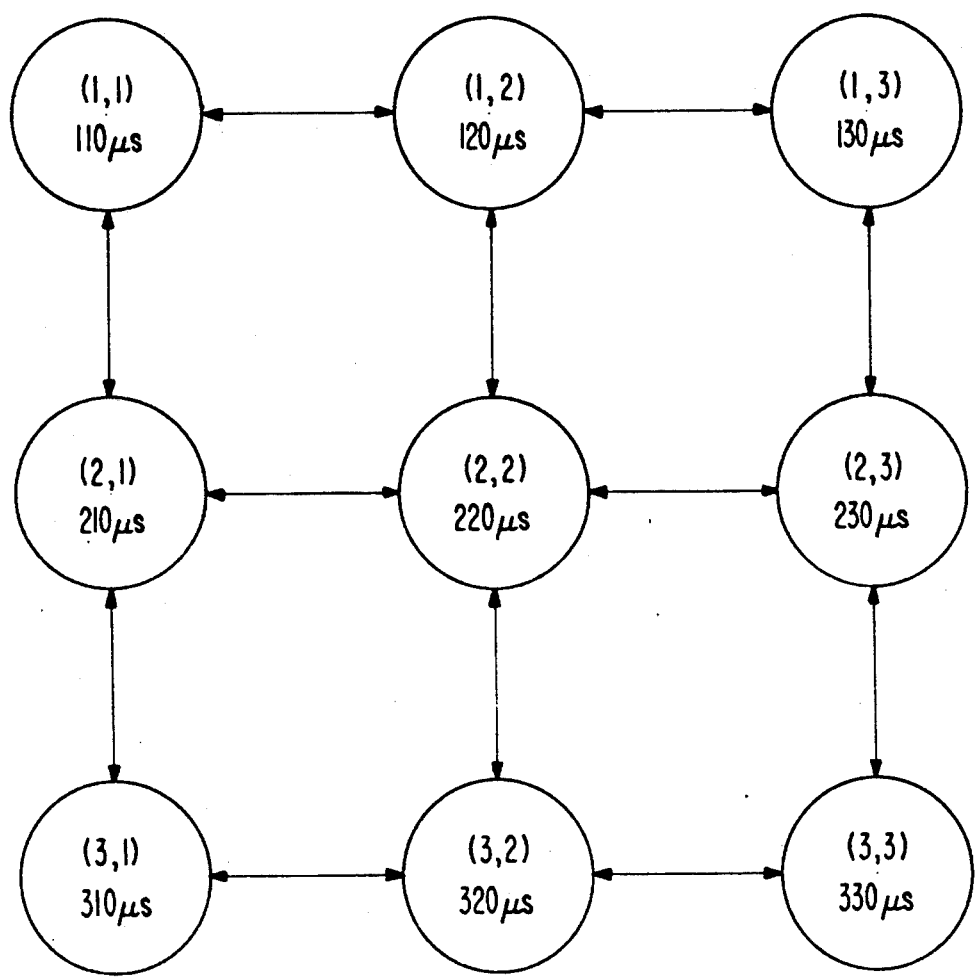
FIG. 3 demonstrates a 3 by 3 rectangular grid with the nodal delays given in microseconds $\mu s$. The nodes are denoted by the coordinates (i,j).

Consider the rectangular grid. Each of the nodes are interconnected by way of two opposing single way buses or by way of a single double way bus. At each node a delay proportional to the cost function at the (x,y) coordinate corresponding to the node (i,j) is introduced from off this neural network. FIG. 3 shows a three by three rectangular network with the time delays (in microseconds) introduced at each node.

Figure 4:
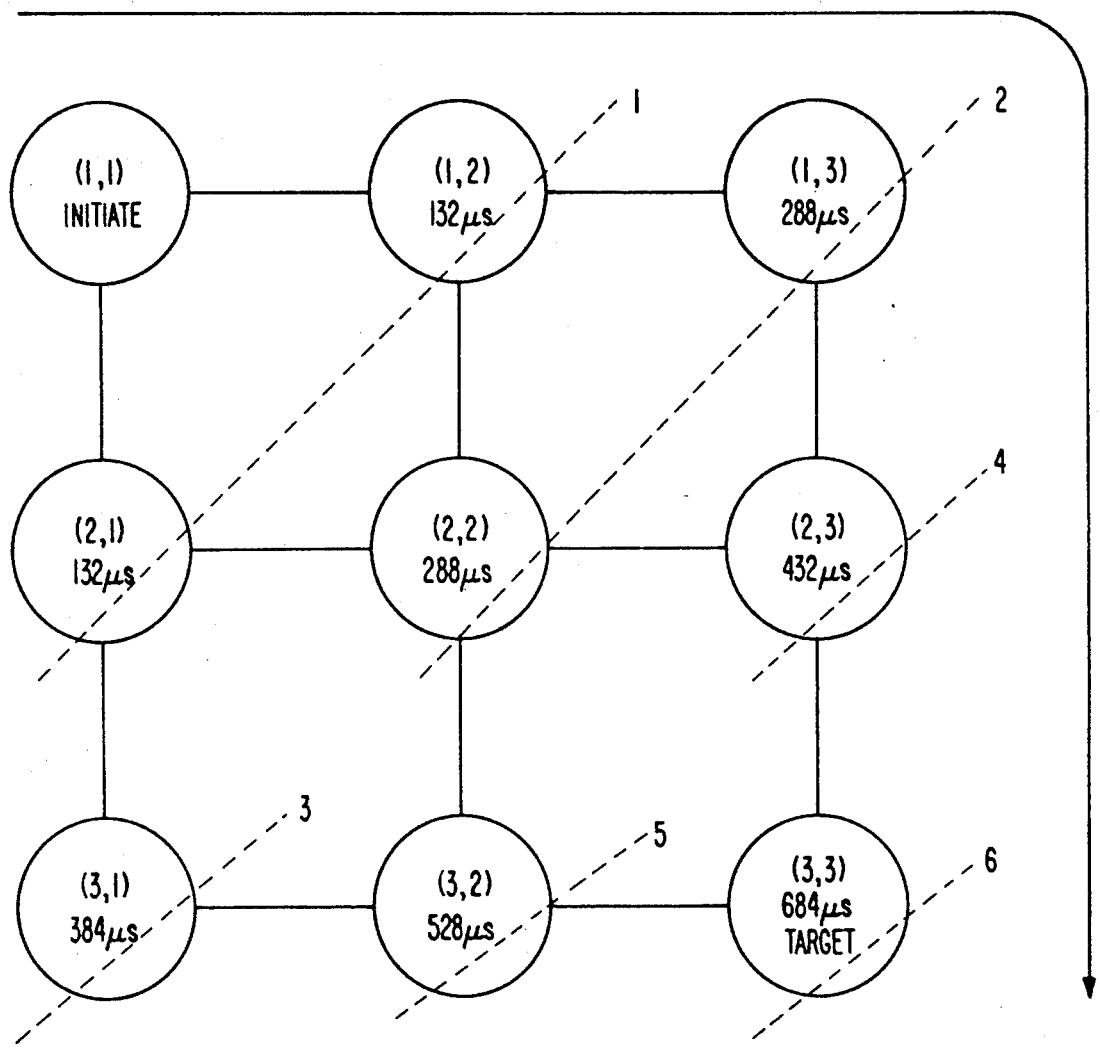
FIG. 4 shows the successive times ($\mu s$) at which each of the nodes is turned on for a simulation based on FIG. 3. Node (1,1) is the initial node and node (3,3) is the target node. The optimal path is evidenced by an arrowed line. The dashed lines indicate the ordered sequence (1,2,3,4,5,6) in which the nodes have been turned on. As described in the text, the optimal path traverses the successive nodes: (1,1), (1,2), (1,3), (2,3), (3,3).

FIG. 4 demonstrates the result of simulating the propagation of the signal, initiated at node (1,1) and detected at node (3,3). In the simulation, the network shut itself off and reset after the target node (3,3) was reached. The values (in microseconds) show the time at which each node was initiated. Nodes (1,2) and (2,1) were reached in 132 $\mu s$. The simulation includes some overhead from the buses and at each node. The next nodes reached were (1,3) and (2,2) in 288 $\mu s$, as the signal has propagated from node (1,1) simultaneously to nodes (1,2) and (2,1). Node (2,1) introduces a delay of 210 μs as opposed to node (1,2) which introduces a smaller delay of 120 μs. Node (1,2) then propagates to nodes (1,3) and (2,2). Node (1,2) also propagates a signal to node (1,1). The backward propagating nodes are ignored in this simplified example as they don't lead to lesser time to reach node (3,3).

Node (3,1) is reached from node (2,1) in 384 μs. Node (1,3) meanwhile has sent a signal which has reached node (2,3) in 432 μs and node (2,2) is sending a signal after its delay to node (3,2). Node (3,2) gets started at 528 μs. Node (2,3), however, initiates node (3,3) at 684 μs and the network is turned off before node (3,2) can reach (3,3) with a signal.

The fastest path through this simplified example cost function field is thus: (1,1), (1,2), (1,3), (2,3), (3,3) and that signal carries with it the identifiers from each of the nodes so that the path is known from the node sequence. All the other paths (which are being computed until the network turns itself off) have a higher summed cost (delay). The path just stated is consequently the optimal solution path.

To summarize the forward mode of operation, a digital packet is broadcast from the node representing the position of the ownship. This signal ripples out to its nearest neighbors which delay the signal according to how large the cost function is. At each successor node, moreover, a digital identification code is tacked on to the initial digital identification protocol (FIG. 6). At the target, or targets, which have been previously selected, the first received signal wins, and the network is reset. At the target, or target node, either the node or an external computer reads the received signal protocol which contains a list of the nodes visited. This list is then the optimal path for a given cost function field.

The network can be run backwards starting with n potential targets or a single target, each with its designated digital identifier as the header in the protocol. The reception and path decoding is then at the initial path point.

Three Dimensional Case

Figure 5A:
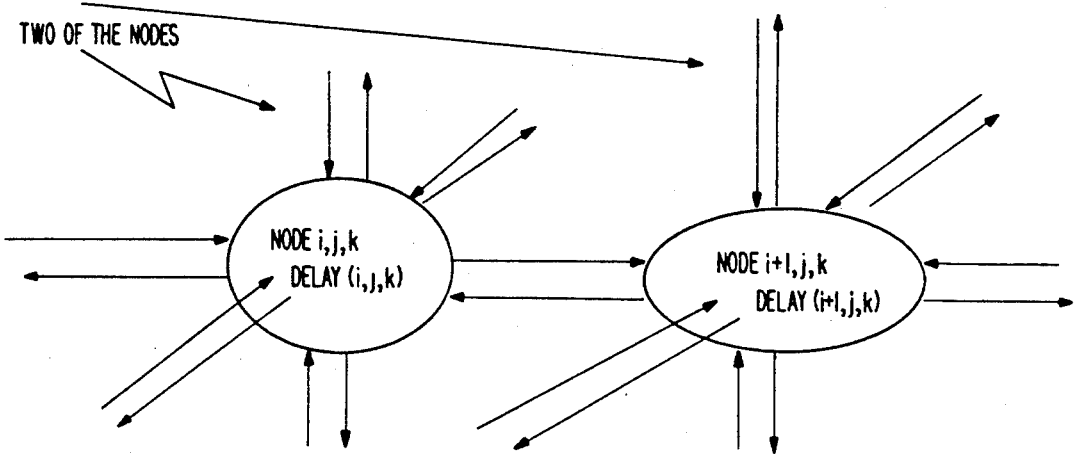
FIG. 5 illustrates the three-dimensional embodiment of the neural network architecture where no time dependence is considered.
Figure 5B:
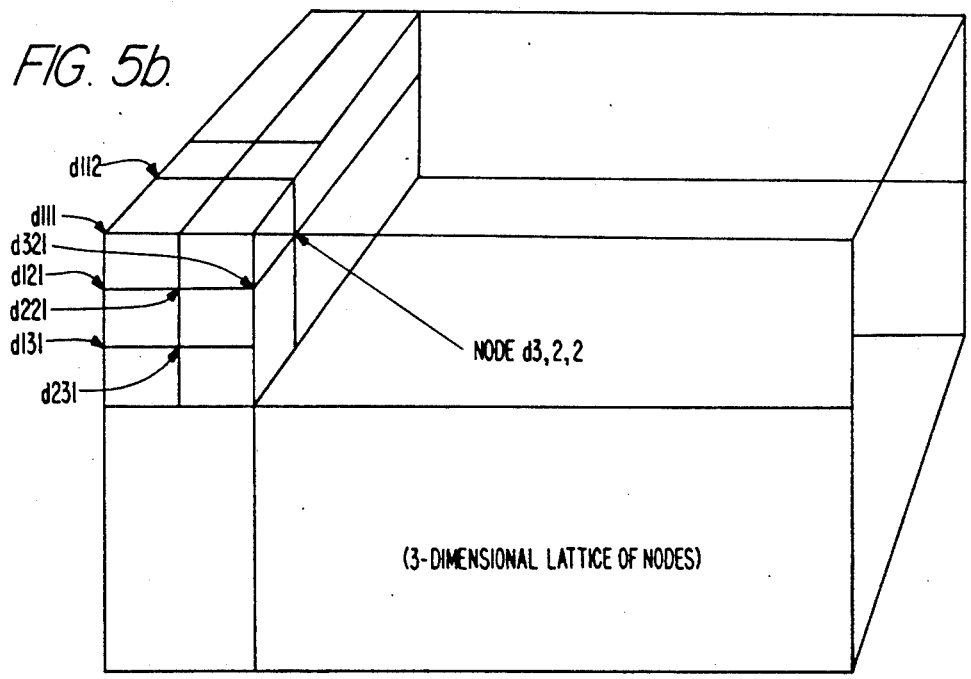
Figure 7A:
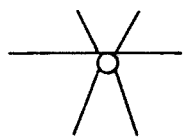
FIGS. 7A-7E are analog illustrations of a 3-dimensional lattice projected onto 2-dimensions.
Figure 7B:
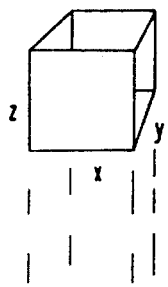
Figure 7D:
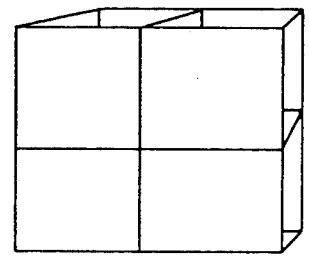
Figure 7C:
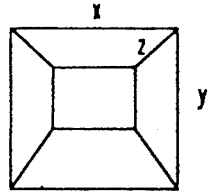
Figure 7E:
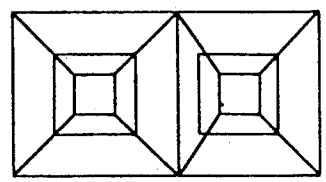

FIG. 5 illustrates a three-dimensional neural network architecture where no explicit time dependence is considered. Each connection of nodes is a two-way channel for incoming and outgoing signals. The connectivity is nearest neighbor. The scalar cost function at each node is set as a delay at each node. There is a requirement that the internode signal travel times be much less than the average delay time at the node. This is so that over the course of progression over the network, the summed internode travel times do not perceptibly distort the effective cost functions (internodal delays).

The cost functions are represented at each node as $C_{ijk}$ or $\alpha\Delta t_{ijk}$ for the three dimensional case. In the forward mode of operation, a digital signal is broadcast from the node representing the position of the ownship. This signal ripples out to its nearest neighbors which delay the signal according to how large the cost function is. At each successor node, moreover, a digital identification code is tacked on to the initial digital identification protocol (FIG. 6). At the target, or target, which has been previously selected, the first received signal wins, and the network is reset. At the target, or target node, either the node or an external computer reads the received signal protocol which contains a list of the nodes visited. This list is then the optimal path for a given cost function field.

The network can be run backwards starting with n potential targets or a single target, each with its designated digital identifier as the header in the protocol. The reception and path decoding is then at the initial path point.

Four-Dimensional Optimal Path Selector

Now, typically, the potentials are represented at a future time with the corresponding positioning of the cost function fields projected ahead to that time. In what follows, it is shown that it is possible to add the time dimension into the neural network directly.

In order to have a representation of time in three-dimensions, a projection of the 4-cube ($\Delta x, \Delta y, \Delta z, \Delta t$) into 3-space is used. This is a hypercube. Thus, for each layer of time, a surrounding cube is added, tied to the inner one at its corners. This is done for each layer of time at each of the 3-dimensional ($\Delta x, \Delta y, \Delta z$) grid squares. In order to keep time flowing in the correct direction, the connection of each outer cube to the inner cube is by way of an ordered connection (e.g., diode).

FIG. 7A–7E shows the analogy of a 3-dimensional lattice projected onto 2-dimensions and FIG. 8 shows a few of the 4-dimensional cubic network elements as they appear in three dimensions.

The choice that has to be made here is to relate the time to progress over the 3-dimensional layer to the time to progress to the next time layer. This is done by use of the velocity which enters into the forecast of the future cost functions. In the case of the application to a tactical or strategic aircraft attack planner, this is done by the use of the closing velocity between the ownship and the target(s) centroid.

FIG. 9 illustrates the operation of the 4-dimensional neural network. One set of three-dimensional grid points at time $t_1$ are connected to the same set of three-dimensional grid points at time $t_2$. Using the representation (x,y,z,t) and $t_2 > t_1$, the information flow is from, say, point $(1,1,1,t_1)$ to four other points: $(1,2,1,t_1)$, $(2,1,1,t_1)$, $(1,1,2,t_1)$, $(1,1,1,t_2)$ Subsequently, each of these points broadcasts information to its nearest neighbors. One exception, however, is that a diode, or equivalent, prevents the information from flowing backward in time from point $(1,1,1,t_2)$ to point $(1,1,1,t_1)$.

In the 2-,3-, and 4-dimension embodiment, the paths can be arranged as an ordered sequence, such that, $$\Delta t_1 \leq \Delta t_2 \leq \Delta t_3 \leq \qquad (19)$$

or equivalently, $$\text{velocity(delayed)}_1 \geq \text{velocity(delayed)}_2 \geq \qquad (20)$$

In both of these above formulae, $\Delta t$ stands for a path integrated time delay and velocity(delayed) stands for the average velocity over a path.

Unless all the paths are of equivalent total time to traverse, then there is a least total time path (or set of least total time paths). Typically in most real cases the cost function is fairly complicated so that that there is one least total time path or path swath.

Node Circuitry

FIG. 11 shows one embodiment of node circuitry. The circuit components at a node for an in/out channel are shown. On the top left, an input signal arrives to the input buffer 30, which may be a shift register. The shift register acts, under the signals from the master clock 32, to shift the input data to the right where it feeds into a multiplexer 34. This multiplexer, under off-neural network chip control, can either send the incoming signal off-chip (if this node has been designated a target) or forward the input data to another shift register 44 which will delay the input data by an amount decided off-chip (and sent via the control signal on line 38), to a programmable timer 40 (which is clock driven). The programmable timer 40 divides the clock frequency such that the input data is not shifted out of the delay shift register until the delay required by the off-chip cost function calculation/specification and present on the control signal line 38 to the off-chip control computer 42 has been met.

The input buffer 30, is a shift register which ingests the incoming bits of data and shifts them over at the clock rate set by the master clock 32. This enters the multiplexer 34. If the off-chip computer 42 has designated that node as a target node, the multiplexer 34, upon receipt of the incoming bit, stream sends it to the off-chip computer if this node is the target. Otherwise it sends it on to the shift register 44 whose purpose is to transmit (after delay) the data bit stream, or data packet, that has been received to the comparator 46 which will locate the end of message data or bits so that the node knows when the end-of-message has occurred.

Thus, comparator 46 looks at the input data and the compares with the end-of-stream code saved in ROM 56. If the data blocks are different, the data stream is passed to delay latches 51 and 52 through multiplexer 54. If the data block matches the end-of-message designation the control output 39 diverts the data stream via the multiplexer 54 to the latch 60 which controls the ROM to feed the end of the output data buffer shift register 58 with the node unique identification block code identifying that particular node plus a end of stream block code. The output buffer shift register 58 then sends out the out data stream.

The ROM 56 contains the information for that node which is the identification data bits for that node. It also has a copy of the end of data bit packet which is used to identify the end of the incoming message stream. The ROM sends its end-of-message data block information to latch 62 which feeds it to comparator 46. Comparator 46 does a bit by bit comparison of the incoming data stream that came in from the input to the multiplexer and to the delay shift register. It compares bit by bit the data coming in. Normally, at the beginning of the message and for other data blocks on that message stream that are identification for previous node identification, there will be no match on that from the incoming data stream. However, the last set of bits on the incoming message that came in from input does have an end-of-message stream on it, that set of bits is compared to the end of data stream that's been entered via the latch from the ROM to the comparator. The multiplexer 54 follows the comparator 46 under normal conditions, sends on the received incoming input data stream through delay latches 51 and 52 and then to the output shift buffer 58. However, if the end of message group of bits has been seen, then multiplexer 54 routes that last set of bits down to the latch 60 which tells the ROM to enter two groups of bits to the output shift buffer 58, the first of which is the node identification, and the second of which is the end-of-message data block. So, the output buffer shift register will transfer the heading information it has, and whatever previously noted identification groups for the different nodes which are present. Then, it adds this particular node's identification and end-of-message group of bits.

The delay latches 51 and 52 provide two data block cycles of delay so that the new identification that's being added in the end of message will be added in at the time that it needs to be. If the comparator does not see the end-of-message in the incoming data bits then it just passes on the data stream to multiplexer 54. If is sees the end-of-message data bits, the comparator sets the multiplexer to redirect the end-of-message bits down to the latch which acts as a control for activating the ROM output. There are basically two ROM block data cycles, one to latch and one to readout the node identifier and the end-of-message bits from the ROM. This will provide a delay which corresponds to that from delay latches 51 and 52 so that the node identifier information is inserted at the end of the previous node identifier information in the data stream.

Circuit components suitable for use in node construction as multiplexers, shift registers, latches and the like are well known and need not be set forth in detail as they are at the discretion of the circuit designer.

NP-Complete Problems

The category of problems included under the terminology of np-complete are those problems for which the time to solve them increases faster than polynomial rate. For example, problems which require the solution of all possible paths in the problem in order to pick out the best one (e.g., shortest) are generally problems of this type. The neural network described in this invention begins to calculate all possible paths. It can decide which one is the solution, however, without waiting for all the path computations to finish. Consequently, this parallel operation, with shutdown after first arrival of signal, is able to achieve solutions to np-complete problems which are mappable, in a mathematical sense, to the presently described neural network.

To those skilled in the art to which the invention pertains, many other modifications and adaptations will occur. Accordingly, the specific disclosure set forth herein should be taken in an illustrative sense, the invention being only limited by the appended claims.

What is claimed is:

1. A method for computing a cost minimum resulting from traversing a path through a network of nodes each of which represents a cost function
   providing an array of cells corresponding to the nodes,
   interconnecting said cells into a n-dimensional network such that each cell is connected for data communication to its nearest neighbors in the network but not to other members of the network,
   causing each cell to receive and retransmit a signal from every neighbor cell
   introducing a data packet signal at one origin cell in the network,
   generating and adding a unique cell identifier to each received signal before retransmission from the respective cell,
   imposing a delay on the retransmitted signal proportional to the cost function value at each respective cell,
   retransmitting delayed signal with identifiers to the nearest neighbor cells, said introduced signal dividing and travelling by all possible paths to a predetermined target cell in the array by all possible paths of nearest neighbor connections between cells and carries with it identifiers for each cell traversed and a time delay proportional to the sum of the delays incurred as a result of the cost function stored a each cell node traversed, and outputting, responsive to receipt of a data packet at the target cell, a list of identifiers for at least the first received data packet.

2. The method as in claim 1 further comprising restoring all the cells to an initial state after receiving at least the first data packet signal at said target cell.

3. The method as in claim 1 further including the step of computing all paths through the network from the origin cell to the target cell in parallel, the first received signal at the target all being that of lowest cost.

4. The method as in claim 1 further including the step of completing the computation from the origin cell to the target cell along at least one path so that at least one optimal solution is found which solution is not a local minimum.

5. The method as in claim 1 further including the step of allowing said cost functions to dynamically change during the computation.

6. The method as in claim 1 further including the step of stopping computations by the network upon receipt of the first solution at the target cell to provide parallel efficiency of computation in that not all paths computations for more expensive paths need be completed.

7. The method as in claim 1 further in which the cost function at each cell is variable and under off-line control so that the method can be programmed to solve cost function problems.

8. A neural computer for computing a cost minimum resulting from traversing a path through a network of cells each of which represents a cost function and spatial locations associated with a space having elements representable by cost functions, an array of cells, means for interconnecting said cells into a network such that each cell is connected for data communication to its nearest neighbors in the network but not to other members of the array, each cell including means for receiving signals from all its nearest neighbors, means for generating and adding a unique cell identifier to each received signal, means for imposing a delay on the signal proportional to the cost function value at each respective cell, and means for retransmitting delayed signal with identifiers to the nearest neighbor cells, so that a data packet introduced at one cell in the array travels by all possible paths to any given target cell in the array by all possible paths of nearest neighbor connections between cells and carries with it identifiers for each cell traversed and a time delay proportional to the sum of the delays incurred as a result of the cost function stored a each cell node traversed, means responsive to receipt of a data packet at the target cell for outputting a list of identifiers for at least the first received data packet enabling said reset means, and reset means for restoring all the cells to an initial state.

9. The network as in claim 8 in which said means for interconnecting said cells simulates a 3-dimensional network.

10. The network as in claim 8 in which said means for interconnecting said cells simulates a 4-dimensional network.

11. The network as in claim 10 in which said 4th dimension are the corrections made to simulate the unipolar paths limited to conduction in a single direction in order to simulate the time dimension.

12. A method for computing a solution of an np-complete problem comprising, providing a grid of interconnected nodes forming a network, each of said nodes representing a cost function, mapping said np-complete problem onto said grid of nodes, introducing a signal onto the grid at starting node, said signal traversing a set of all paths through said network of nodes, designating an end point or target node, generating and adding a unique node identifier to each received signal before retransmission from the respective node, imposing a delay on the retransmitted signal proportional to the cost function value at each respective node, retransmitting delayed signal with identifiers to the nearest neighbor nodes, said introduced signal dividing and travelling by all possible paths to a predetermined target node in the array by all possible paths of nearest neighbor connections between nodes and carrying with it identifiers for each node traversed and with a time delay proportional to the sum of the delays incurred as a result of the cost function stored a each cell node traversed, and outputting, responsive to receipt of a data packet at the target node, a list of identifiers for path traversed by at least the first received data packet, and accepting the path so identified as the solution to the np-complete problem.

* * * * *

UNITED STATES PATENT AND TRADEMARK OFFICE
CERTIFICATE OF CORRECTION

PATENT NO. : 5,050,096

DATED : September 17, 1991

INVENTOR(S) : Abraham N. Seidman

It is certified that error appears in the above-identified patent and that said Letters Patent is hereby corrected as shown below:

Column 2, line 9, formula (2) should read as follows:
$$S = \int L(x, \dot{x}, t) dt$$

Column 3, lines 17-21, formula (4) should read as follows:
$$\Delta \int_{t_1}^{t_2} L dt \equiv \int_{t_1+\delta t_1}^{t_2+\delta t_2} L(\alpha) dt - \int_{t_1}^{t_2} L(0) dt$$

Column 3, lines 27-33, formula (5) should read as follows:
$$\Delta \int_{t_1}^{t_2} T dt = 0$$

Column 3, lines 41-43, formula (6) should read as follows:
$$T = 1/2 M_{jk}(q) \dot{q}_j \dot{q}_k$$

Column 3, lines 60-65, formula (10) should read as follows:
$$\Delta \int_{t_1}^{t_2} T dt = 0 = \Delta \int_{t_1}^{t_2} \sqrt{T} d\rho$$

Column 4, lines 2-6, formula (12) should read as follows:
$$\Delta \int_{\rho_1}^{\rho_2} (H - V(q))^{1/2} d\rho = 0$$

Column 5, lines 47-49, formula (17) should read as follows:
$$T = 1/2 M v^2 + 1/2 I_{ij} \Omega_i \Omega_j$$

Column 8, lines 49-50, formula (19) should read as follows:
$$\Delta t_1 \leq \Delta t_2 \leq \Delta t_3 \leq \ldots$$

UNITED STATES PATENT AND TRADEMARK OFFICE
CERTIFICATE OF CORRECTION

PATENT NO. : 5,050,096

DATED : September 17, 1991

INVENTOR(S) : Abraham N. Seidman

It is certified that error appears in the above-identified patent and that said Letters Patent is hereby corrected as shown below:

Column 8, lines 54-55, formula (20) should read as follows:
$$velocity(delayed)_1 \geq velocity(delayed)_2 \geq \ldots$$

Signed and Sealed this

Twenty-third Day of March, 1993

Attest:

STEPHEN G. KUNIN

*Attesting Officer*  *Acting Commissioner of Patents and Trademarks*